United States Patent
Zhou et al.

(10) Patent No.: US 8,848,896 B2
(45) Date of Patent: Sep. 30, 2014

(54) MESSAGE-BASED NOTIFYING METHOD FOR NOTIFYING WAITING QUEUE AND APPLICATION SERVER

(75) Inventors: Jianming Zhou, Beijing (CN); Congxing Ouyang, Beijing (CN); Jinglei Liu, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 995 days.

(21) Appl. No.: 12/530,140

(22) PCT Filed: Nov. 15, 2007

(86) PCT No.: PCT/CN2007/071069
§ 371 (c)(1),
(2), (4) Date: Feb. 25, 2010

(87) PCT Pub. No.: WO2008/106853
PCT Pub. Date: Sep. 12, 2008

(65) Prior Publication Data
US 2010/0142696 A1 Jun. 10, 2010

(30) Foreign Application Priority Data
Mar. 5, 2007 (CN) .......................... 2007 1 0064178

(51) Int. Cl.
*H04M 3/42* (2006.01)
*H04L 29/08* (2006.01)
(52) U.S. Cl.
CPC .............. *H04L 67/141* (2013.01); *H04L 67/14* (2013.01)
USPC ............ 379/215.01; 379/201.01; 379/210.02; 379/211.02; 379/212.01
(58) Field of Classification Search
CPC . H04M 3/428; H04M 3/4281; H04M 3/4285; H04M 3/4286; H04M 3/436; H04M 3/523; H04M 3/5238; H04M 1/57; H04M 1/573; H04M 1/578; H04M 11/06; H04L 67/14; H04L 67/141
USPC ............. 379/215.01, 266.01, 266.02, 266.04, 379/266.06, 266.03, 309, 93.01, 93.04, 379/93.35, 142.08
See application file for complete search history.

(56) References Cited

U.S. PATENT DOCUMENTS

| | | | | |
|---|---|---|---|---|
| 6,141,328 | A * | 10/2000 | Nabkel et al. ................. | 370/259 |
| 6,694,009 | B1 * | 2/2004 | Anderson et al. ........ | 379/266.06 |
| 6,754,333 | B1 * | 6/2004 | Flockhart et al. ........ | 379/266.01 |
| 8,411,843 | B1 * | 4/2013 | Cyriac et al. ............. | 379/266.06 |
| 2001/0024495 | A1 * | 9/2001 | Verbil et al. ............. | 379/215.01 |
| 2002/0022474 | A1 * | 2/2002 | Blom et al. ................... | 455/410 |
| 2003/0103619 | A1 * | 6/2003 | Brown et al. ............ | 379/266.01 |
| 2007/0280468 | A1 * | 12/2007 | Patel et al. ............... | 379/265.01 |

FOREIGN PATENT DOCUMENTS

| | | |
|---|---|---|
| CN | 1585559 A | 2/2005 |
| CN | 1700716 A | 11/2005 |
| CN | 200410038332.5 | 11/2005 |
| WO | 98/48607 | 11/1998 |

* cited by examiner

*Primary Examiner* — Khai N Nguyen
(74) *Attorney, Agent, or Firm* — Workman Nydegger (57) ABSTRACT

The present invention relates to a message-based notifying method for notifying a waiting queue and an application server, wherein the method includes: sending, by a calling terminal, a call request to a called terminal; forwarding, by an application server, to the called terminal the call request sent from the calling terminal, and determining from a response message returned from the called terminal whether the called terminal is in an idle status; and if the called terminal is in a busy status, then adding by the application server the calling terminal into a waiting enqueuing queue of the called terminal, and sending to the calling terminal a waiting notification message containing a waiting queue value corresponding to the calling terminal; or if the called terminal is in an idle status, then establishing directly a communication connection between the calling terminal and the called terminal.

19 Claims, 8 Drawing Sheets

MESSAGE-BASED NOTIFYING METHOD FOR NOTIFYING WAITING QUEUE AND APPLICATION SERVER

FIELD OF THE INVENTION

The present invention relates to a notifying method and an application server and in particular to a notifying method for providing real time waiting information of a called terminal and an application server. The present invention is in the field of voice calls.

BACKGROUND OF THE INVENTION

Among various existing real time information service approaches, it is common to arrange a call center for a called party (a called user, also known as a called terminal or a callee). The call center allocates different service access numbers for different information service fields. A calling party (a calling user, also known as a calling terminal or a caller) sends a corresponding call request as needed to thereby establish a session with a corresponding called party over the call center.

Figure 1:
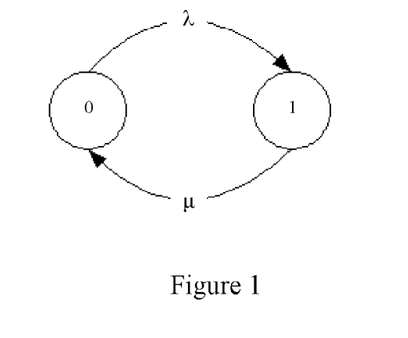
FIG. 1 is the existing single service window loss queuing model M/M/1/1 for voice calls.

A single service window loss queuing model M/M/1/1 is generally adopted for existing voice call services, where M denotes a probability distribution, i.e., a negative exponential distribution (random calls of users typically comply with a negative exponential distribution in a general call model). In single service window loss queuing model M/M/1/1, the first "M" refers to that a probability distribution of an interval of time T at which different calling users initiate successively calls complies with a negative exponential distribution with a parameter "λ", and the second "M" refers to that a probability distribution of a communication period of time T consumed for a user complies with a negative exponential distribution with a parameter "μ". In the M/M/1/1 model, the first "1" refers to the number of service window(s), that is, a called user is in communication with only one calling user at a time, and the second "1" refers to the maximum queue capacity containing users who are being served or queuing, that is, only one calling user is allowed to be served at a time. FIG. 1 illustrates a specific status flow chart, where "0" denotes an idle service window and "1" denotes a busy service window. According to the existing single service window loss queuing model M/M/1/1, a calling user will give up automatically the chance to be served when the calling user finds that the called user is busy, so that a plurality of calling users who are calling the same called user are not aware of a current queuing condition of the called user according to the existing single service window loss queuing model M/M/1/1.

There is another call queuing method in the prior art, for example, as disclosed in the application No. CN 200410038332.5, and in this call queuing method, a calling user will be enqueued automatically in a private queue of a called user when the called user is determined to be in a "busy" status or will be connected to the called party when the called user is idle. Although this call queuing method can enable automatic queuing in the private queue of the called user when the called user is in a "busy" status to thereby increase the number of enqueued users as compared with the first call approach in the existing single service window loss queuing model M/M/1/1, this call queuing method can provide no relevant message notification. According to this call queuing method, a calling user can only be temporarily stored in the private queue of a called user until the called user is available to be connected to the calling user, so that the calling user still can not acquire its condition of being queued for the called user but wait blindly.

It is possible in the prior art to enable communication between users, to provide information on an idle or busy status of a called terminal and to notify through voice a calling terminal about an idle or busy status of the called terminal when no communication has been established between the calling terminal and the called terminal. Unfortunately, when a plurality of calling users wish to establish communication with the same called user, for example, a calling user 1, a calling user 2, . . . , and a calling user 5 wish to establish call connections with a called user A successively, if the called user A is in communication with the calling user 1, then the reset calling users 2-5 have to wait, and the calling users 2-5 can not determine whether it is necessary to continue with waiting although they are aware of ongoing communication of the called user A and acquire the busy status of the callee, so that the calling user 5, for example, with a relatively large number of preceding waiters will waste a period of time on waiting, and a calling user with few preceding users, e.g., the calling user 2, is not aware of the number of preceding waiters and thus may improperly cancel waiting, which may influence a demand of the calling user.

SUMMARY OF THE INVENTION

An object of an embodiment of the invention is to provide a message-based notifying method for notifying about a waiting queue and an application server through which a calling terminal calling a called terminal can acquire a current waiting condition in a timely way so as to address the drawback in the prior art of the impossibility to determine whether it is necessary to continue with waiting when the called terminal is in a busy status because no waiting queue status of the called terminal is provided.

In order to attain the above object, an embodiment of the invention provides a message-based notifying method for notifying about a waiting queue, which includes:

Sending, by a calling terminal, a call request to a called terminal;

Forwarding, by an application server, the call request sent from the calling terminal to the called terminal, and determining from a response message returned from the called terminal whether the called terminal is in an idle status; and if the called terminal is in a busy status, then adding by the application server the calling terminal into a waiting enqueuing queue of the called terminal, and sending to the calling terminal a waiting notification message containing a waiting queue value corresponding to the calling terminal; or if the called terminal is in an idle status, then establishing directly a communication connection between the calling terminal and the called terminal.

In order to attain the above object, an embodiment of the invention further provides an application server including:

a call processing module, adapted to perform basic call processing and switching processes between a calling terminal and a called terminal;

a response message determination module, connected with the call processing module and adapted to receive a response message returned from the called terminal, to determine whether the called terminal is in an idle status, and to establish a connection between the calling terminal and the called terminal through the call processing module when the called terminal is in an idle status;

a queue processing module, connected with the response message determination module and adapted to add the calling terminal into a waiting enqueuing queue of the called terminal when the called terminal is in a busy status, and to calculate waiting queue values corresponding to respective calling terminals in the waiting enqueuing queue of the called terminal;

a storage module, connected with the queue processing module and adapted to store the waiting queue values corresponding to the respective calling terminals; and a waiting message notification module, connected with the storage module and the response message determination module and adapted to send to the calling terminal a waiting notification message containing the waiting queue value corresponding to the calling terminal when the called terminal is in a busy status.

An embodiment of the invention proposes a method for notifying about a waiting queue value of a calling terminal and an application server in the field of real time voice calls, so that when a called terminal is busy, the method for notifying about a waiting queue and the application server provided according to an embodiment of the invention can notify accurately the calling terminal about the number of waiters in a current waiting enqueuing queue of the called terminal, i.e., how many users for whom the calling terminal has to wait until it can establish a call connection with the called user, and thus the calling terminal can decide whether it is necessary to continue with waiting to thereby avoid a waste of time.

Technical solutions of the invention will be further detailed below with reference to the drawings and embodiments thereof.

BRIEF DESCRIPTION OF THE DRAWINGS

FIG. 8($a$) is a schematic diagram of a fourth embodiment of a waiting enqueuing queue when a calling terminal cancels waiting in the message-based notifying method for notifying about a waiting queue according to the invention;

FIG. 8($b$) is a schematic diagram of the fourth embodiment of the rearranged waiting enqueuing queue when the calling terminal cancels waiting in the message-based notifying method for notifying about a waiting queue according to the invention;

DETAILED DESCRIPTION OF THE EMBODIMENTS

Figure 2:
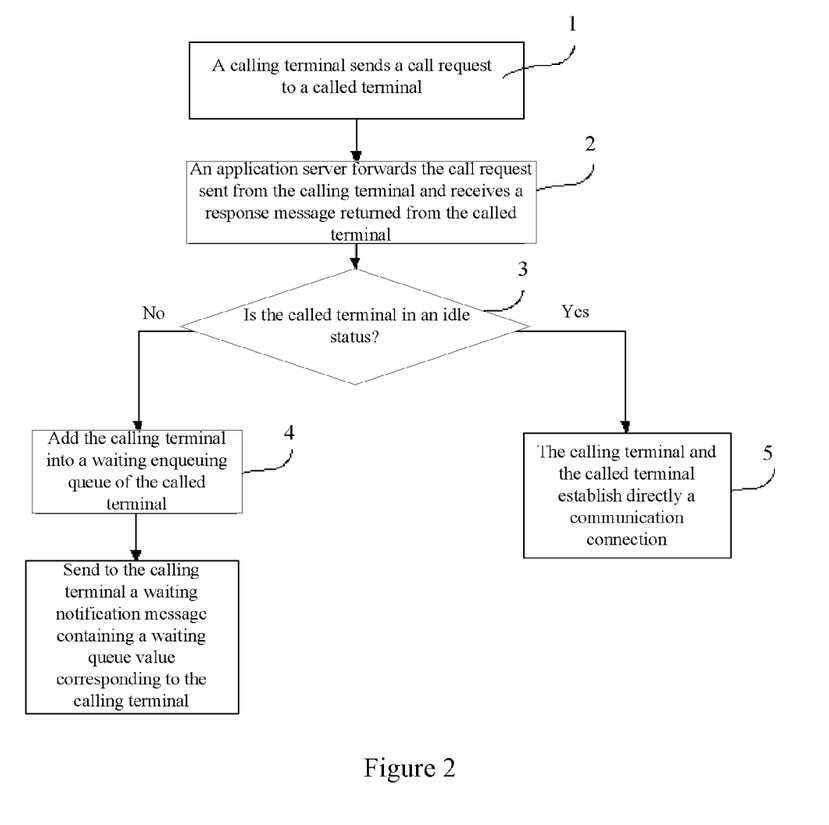
FIG. 2 is a flow chart of a first embodiment of a message-based notifying method for notifying about a waiting queue according to the invention.

Reference is made to FIG. 2 illustrating a flow chart of a first embodiment of a message-based notifying method for notifying about a waiting queue according to the invention, and as illustrated in FIG. 2, this embodiment includes:

Step 1. A calling terminal sends a call request to a called terminal;

Step 2. An application server forwards to the called terminal the call request sent from the calling terminal and receives a response message returned from the called terminal;

Step 3. A determination is made as to whether the called terminal is in an idle status, and if so, then the flow goes to the step 5; otherwise, the flow goes to the step 4;

Step 4. The calling terminal is added into a waiting enqueuing queue of the called terminal, and a waiting notification message containing a waiting queue value corresponding to the calling terminal is sent to the calling terminal;

Step 5. The calling terminal and the called terminal establish directly a communication connection.

In this embodiment, the application server upon reception of the call request makes different determinations dependent upon the response message returned from the called terminal in such a way that the calling terminal is notified in the reverse notification message about the waiting queue value corresponding to the calling terminal if the called terminal is in a busy status, so that the calling terminal can acquire from the received reverse notification message the status of the called terminal and the number of preceding waiters. The waiting notification message containing the waiting queue value of the calling terminal can prompt the calling terminal about the current waiting queue value in any one or combination of a voice notification, a short message notification, a multimedia message notification, an email notification or a notification to another terminal bound with the calling terminal. For example, the waiting queue value corresponding to the calling terminal is written into a presence status of the called terminal, which in turn is sent to the calling terminal. The calling terminal can acquire from the waiting notification message the number of preceding waiters and determine whether it is necessary to continue with waiting to thereby avoid a waist of time.

Figure 3:
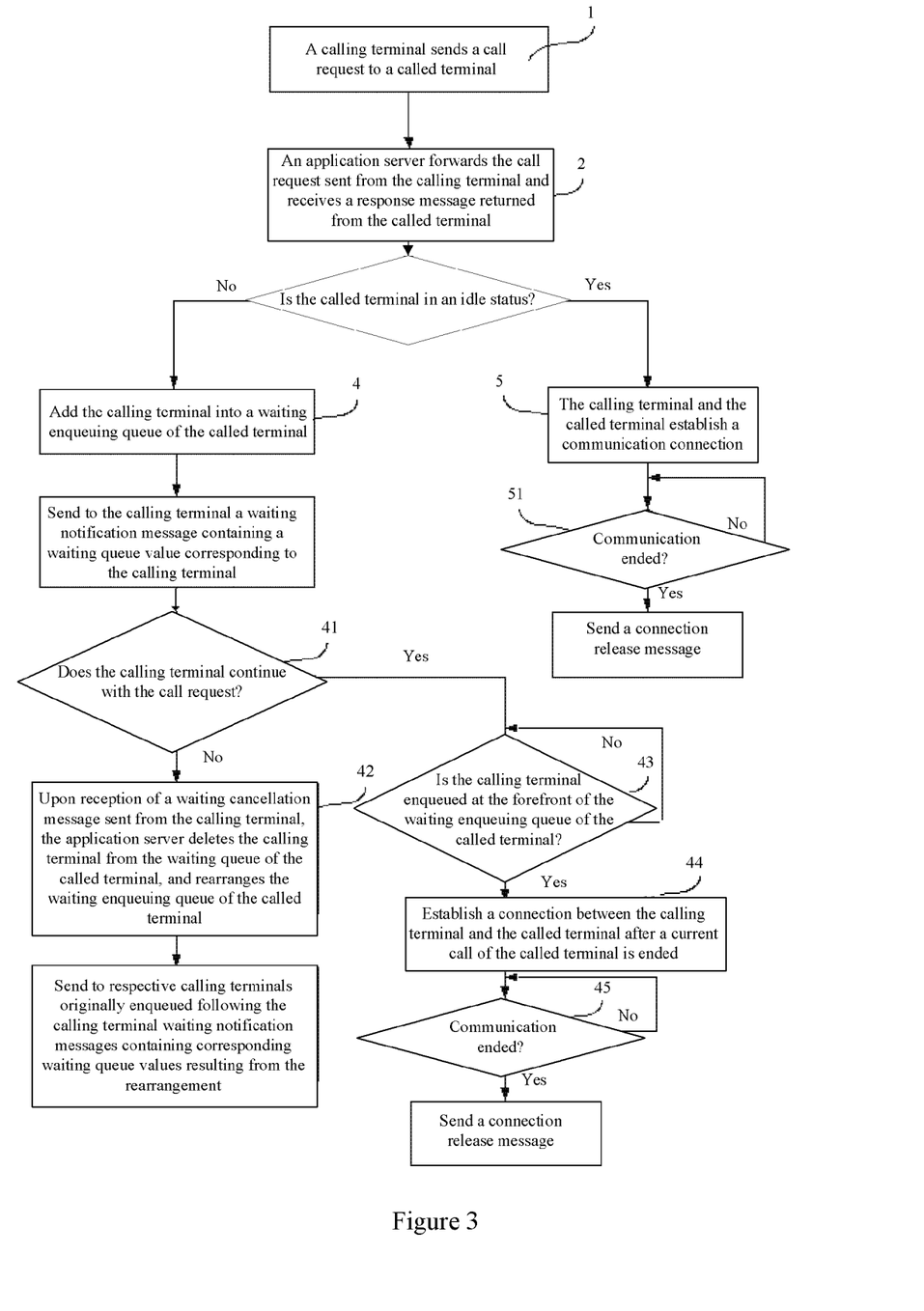
FIG. 3 is a flow chart of a second embodiment of the message-based notifying method for notifying about a waiting queue according to the invention.

Reference is made to FIG. 3 illustrating a flow chart of a second embodiment of the message-based notifying method for notifying about a waiting queue according to the invention. This embodiment similar to that in FIG. 2 has substantially the same flow except for further inclusion of the following steps after sending the waiting notification message in the step 4:

Step 41. A determination is made as to whether the calling terminal continues with the call request, that is, whether it continues with waiting, and if so, then the flow goes to the step 43; otherwise, the flow goes to the step 42.

Step 42. Upon reception of a waiting cancellation message sent from the calling terminal, the application server deletes the calling terminal from the waiting enqueuing queue of the called terminal, rearranges the waiting enqueuing queue of the called terminal, and sends to respective calling terminals enqueued originally following the calling terminal respective waiting notification messages containing corresponding waiting queue values resulting from the rearrangement.

Step 43. The calling terminal continues with waiting, the application server determines whether the calling terminal is enqueued at the forefront of the waiting enqueuing queue of the called terminal, and if so, then the flow goes to the step 44; otherwise, the flow continues with waiting while repeating the step 43;

Step 44. A connection is established between the calling terminal and the called terminal after a current call of the called terminal is ended.

Step 45. A determination is made as to whether communication between the calling terminal and the called terminal is ended, and if so, then a connection release message is sent; otherwise, the flow continues with executing the step 45.

In this embodiment, the calling terminal obtaining the current waiting queue value can take measures immediately to give up waiting and cancel the call if there are a too large number of waiters preceding the calling terminal to thereby avoid a waste of time. Upon reception of the waiting cancellation message, the application server shall rearrange the waiting enqueuing queue of the called terminal by deleting the calling terminal cancelling waiting from the waiting queue and notify the other waiting users following the caller cancelling waiting about the waiting notification message resulting from the rearrangement.

Figure 4:
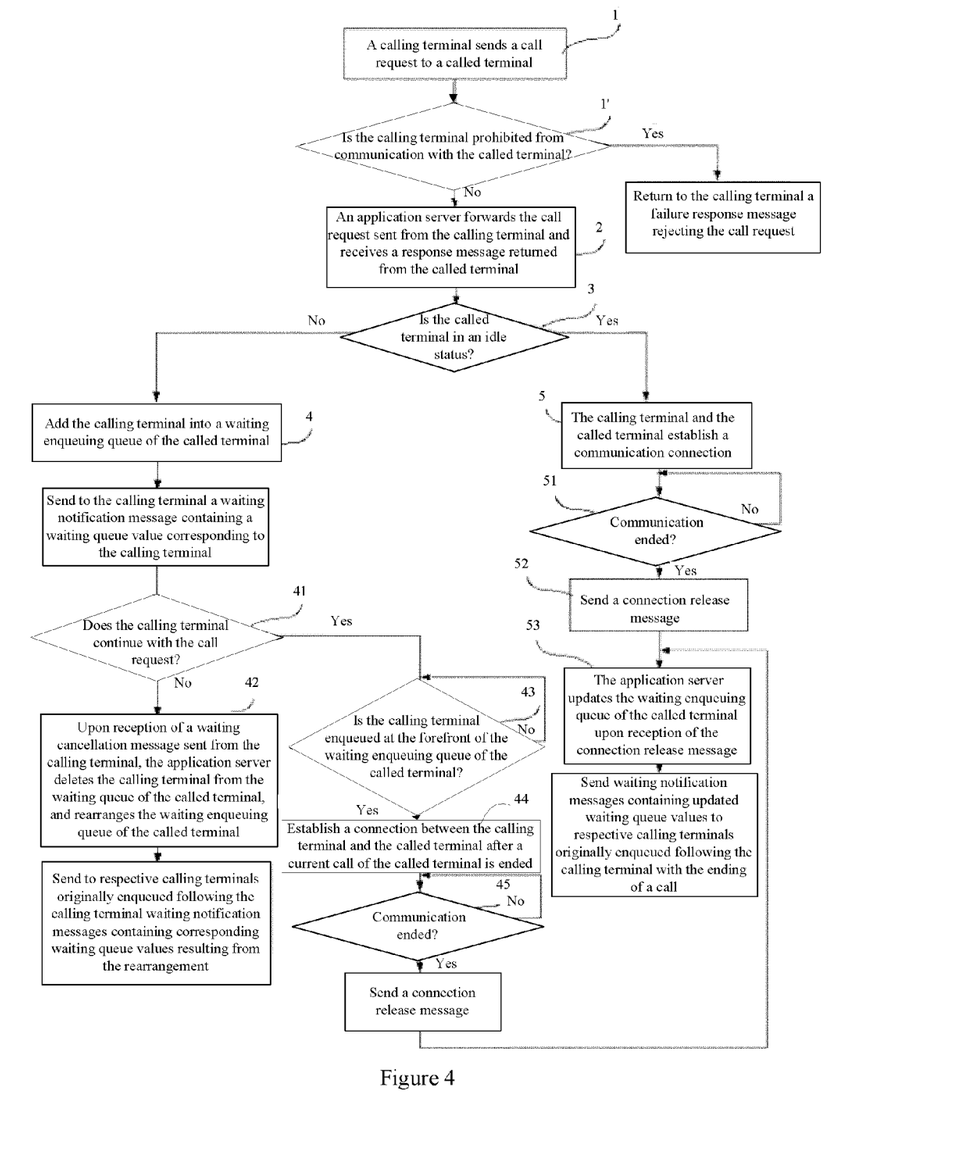
FIG. 4 is a flow chart of a third embodiment of the message-based notifying method for notifying about a waiting queue according to the invention.

FIG. 4 is a flow chart of a third embodiment of the message-based notifying method for notifying about a waiting queue according to the invention. As compared with FIG. 2 and FIG. 3, this embodiment further adds some processing steps, particularly this embodiment including the following steps:

Step 1. A calling terminal sends a call request to a called terminal;

Step 1'. A determination is made as to whether the calling terminal belongs to calling terminals who are prohibited from communication with the called terminal, for example, the calling terminal is stored in a "blacklist" of the called terminal, and if so, then a failure response message refusing the call request is returned to the calling terminal and the call is ended; Otherwise, the flow goes to the step 2. The "blacklist" well known to those skilled in the art indicates data of users with whom the called user does not wish to establish any call, and the called terminal can add the data of some users who are prohibited from communication into the "blacklist" to thereby avoid their being enqueued in a waiting enqueuing queue of the called terminal.

Step 2. An application server forwards to the called terminal the call request sent from the calling terminal and receives a response message returned from the called terminal;

Step 3. A determination is made as to whether the called terminal is in an idle status, and if so, then the flow goes to the step 5; otherwise, the flow goes to the step 4;

Step 4. The calling terminal is added into the waiting enqueuing queue of the called terminal, and a waiting notification message containing a waiting queue value corresponding to the calling terminal is sent to the calling terminal;

Step 41. A determination is made as to whether the calling terminal continues with the call request, that is, whether it continues with waiting, and if so, then the flow goes to the step 43; otherwise, the flow goes to the step 42.

Step 42. Upon reception of a waiting cancellation message sent from the calling terminal, the application server deletes the calling terminal from the waiting enqueuing queue of the called terminal, rearranges the waiting enqueuing queue of the called terminal, and sends to respective calling terminals enqueued originally following the calling terminal respective waiting notification messages containing corresponding waiting queue values resulting from the rearrangement.

Step 43. The calling terminal continues with waiting, the application server determines whether the calling terminal is enqueued at the forefront of the waiting enqueuing queue of the called terminal, and if so, then the flow goes to the step 44; otherwise, the flow continues with executing the step 43;

Step 44. A connection is established between the calling terminal and the called terminal after a current call of the called terminal is ended.

Step 45. A determination is made as to whether communication between the calling terminal and the called terminal is ended, and if so, then a connection release message is sent; otherwise, the flow continues with executing the step 45.

Step 5. The calling terminal and the called terminal establish directly a communication connection.

Step 51. A determination is made as to whether communication between the calling terminal and the called terminal is ended, and if so, then the flow goes to the step 52; otherwise, the flow goes to the step 51;

Step 52. A connection release message is sent;

Step 53. Upon reception of the connection release message, the application server updates the waiting enqueuing queue of the called terminal and sends to respective calling terminals enqueued originally in the waiting enqueuing queue following the calling terminal with the ending of a call respective waiting notification messages containing respective waiting queue values corresponding to that calling terminals resulting from updating of the waiting enqueuing queue.

In the embodiment of FIG. 4, the calling terminal can allow a connection to be established with the called terminal particularly in such a way that when the calling terminal is a calling terminal enqueued at the forefront of the waiting enqueuing queue of the called terminal, a connection is established with the called terminal when the current call of the called terminal is ended. For example, there are 5 users in the current waiting enqueuing queue of the called terminal, which indicates that there are 5 calling terminals A, B, C, D and E, each of which wishes to establish a communication connection thereof with the called terminal, and after the respective calling terminals A, B, C and D are removed from the waiting queue (they end their calls with the called terminal or cancel waiting), the calling terminal E is enqueued at the forefront of the waiting enqueuing queue and is allowed to establish a connection with the called terminal after the calling terminal D ends the call or after the calling terminal C ends the call and the calling terminal D cancels waiting. This embodiment additionally involves determining whether a caller of a call is a user who is prohibited from communication with a callee, e.g., a user in a blacklist, and if so, then a rejection message is returned directly without forwarding any call request to avoid the addition of the user in the blacklist into the waiting enqueuing queue, which would otherwise prolong enqueuing and consequently influence any subsequent operating efficiency and calculation. Those calling terminals which are prohibited from communication can be excluded directly from the waiting enqueuing queue of the called terminal, and each of those added into the waiting enqueuing queue is a user who is potentially connected to the called user, so that both the calling and called terminals can be offered mutual experiences.

The invention can be implemented in various forms of embodiments, and the foregoing illustrative descriptions of the technical solutions according to the invention with reference to the drawings taking FIG. 2 to FIG. 4 as examples shall not be constructed in a way that the embodiments applicable to the invention will merely be limited to the specific embodiments. Those ordinarily skilled in the art shall appreciate that the embodiments presented above are merely a few illustrative ones among various preferred embodiments, and the claimed scope of the technical solutions according to the invention shall encompass any embodiment in which a reverse waiting notification message containing the number of current waiters preceding to an unconnected one among a plurality of callers calling the same callee is returned to that caller.

An enqueuing queue processing flow of a waiting enqueuing queue in the invention will be described by way of an example below with reference to FIG. 5 to FIG. 8.

Figure 5:
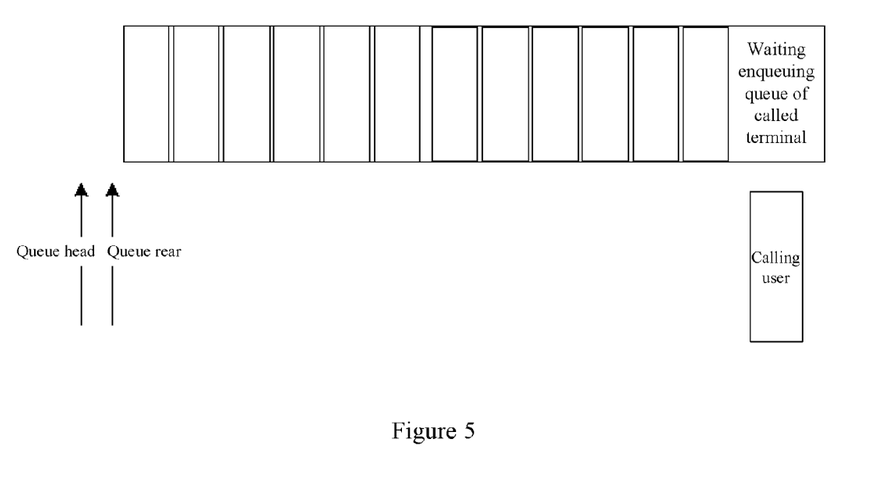
FIG. 5 is a schematic diagram of a first embodiment of a waiting enqueuing queue of a called terminal in the message-based notifying method for notifying about a waiting queue according to the invention.
Figure 6:
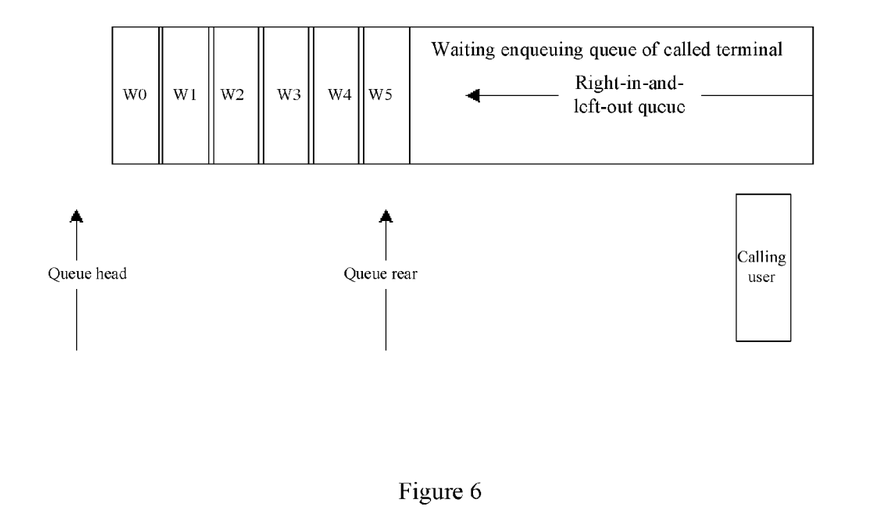
FIG. 6 is a schematic diagram of a second embodiment of a waiting enqueuing queue of a called terminal in the message-based notifying method for notifying about a waiting queue according to the invention.

1. As illustrated in FIG. 5, initially a waiting enqueuing queue of a called terminal (simply a callee) is null, and for convenient descriptions, a pointer at the head of the queue is denoted with the "head", and a pointer at the rear of the queue is denoted with the "rear", and their initial values are head=rear=−1. Each of calling terminals (simply callers) in the waiting enqueuing queue is provided with a position attribute (simply "pos") and a waiting attribute (simply "wait"), and W[i] denotes an object array of the $i^{th}$ caller in the queue, where W[i].pos denotes the global position of the $i^{th}$ caller in the queue; W[i].wait denotes that the $i^{th}$ caller is the W[i].wait$^{th}$ waiter of the callee, that is, the respective waiting queue values corresponding to the respective calling terminals according to the invention; W[i].wait=W[i].pos-head; and an initial value of W[i].pos is the value of the "rear" after the $i^{th}$ caller added into the queue. In FIG. 5, there is a user being served, i.e., the first caller, the upper half of FIG. 5 denotes the waiting enqueuing queue of the callee, and the lower right corner thereof denotes a user service window currently in service. As can be apparently seen from FIG. 5 to FIG. 8, there may be more than one user in the waiting enqueuing queue of the callee, but only one window currently in service, that is, only a user receives communication at a time, and the other users in the waiting enqueuing queue have to wait;

2. When the calling user has not yet ended communication but another caller initiates a call to the same callee, at this time the latter is added into the waiting queue, the position to which the "rear" points is moved backward by one waiter, the "rear" is incremented in value by one to be 0, and the "head" still points to the position at the head of the queue and the value thereof is −1; and when a further caller calls the callee and is added into the waiting enqueuing queue of the callee, the "rear" is further incremented in value by one. As illustrated in FIG. 6, there are 6 calling users W0-W5 who initiate sequentially call requests, and the pointer "rear" at the rear of the queue finally points to the position of W5 in the queue and the value thereof is 5. W[5].wait=W[5].pos-head=5−(−1)=6, that is, W5 is the sixth waiter.

Figure 7:
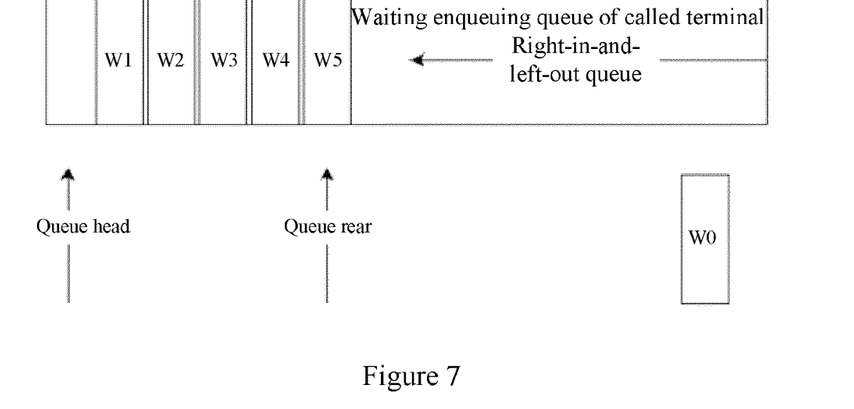
FIG. 7 is a schematic diagram of a third embodiment of a waiting enqueuing queue of a called terminal in the message-based notifying method for notifying about a waiting queue according to the invention.
Figure 8A:
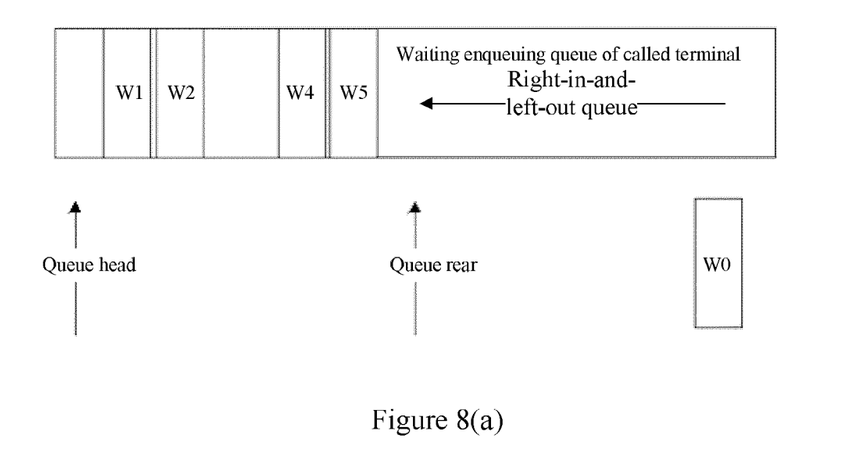
Figure 8B:
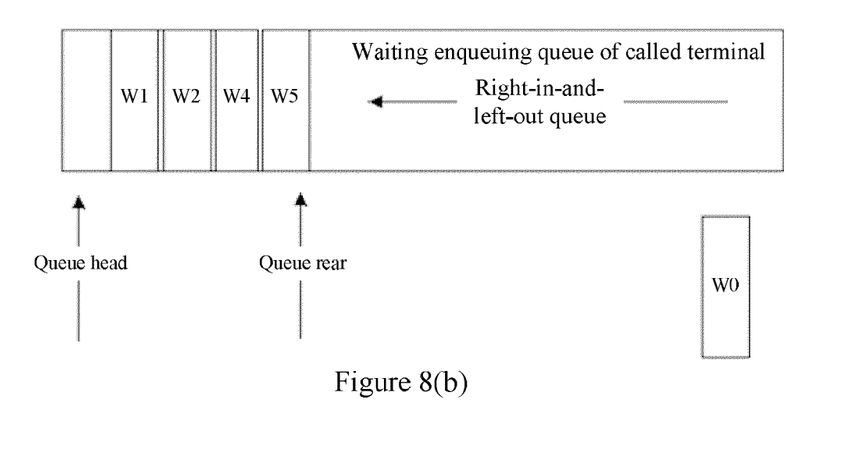

3. When the calling user ends communication, the user W0 at the head of the queue is selected to establish a connection with the callee for communication, the callee W0 is removed from the queue, the "head" points to the next position and the value thereof is incremented by one to be 0, and the "rear" is unchanged in position and the value thereof is still 5. As illustrated in FIG. 7, the value of the pointer "head" at the head of the queue is 0, and the value of the pointer "rear" at the rear of the queue is 5. At this time, W[5].wait=5−0=5, that is, W5 is the fifth waiter;

4. Similarly, the "rear" is incremented in value by one each time a caller is added and the "head" is incremented in value by one each time a caller is removed until W[i].wait=W[i].pos-head=1 which indicates that the caller i is a caller who is currently enqueued at the forefront of the queue. When the application server receives a connection release message sent from the callee ending the current communication, the "head" is incremented in value by one, the number of waiters preceding the caller i enqueued at the forefront of the queue is W[i].wait=1−1=0, and the caller i will establish communication with the callee and removed from the waiting queue, that is, the caller enqueued at the forefront of the queue can establish a connection with the callee after the callee ends communication;

5. When a caller in the waiting enqueuing queue cancels waiting in the midway, the queue will be rearranged in such a way that the positions of the respective continuously waiting callers following the caller cancelling waiting in the original waiting enqueuing queue are moved forward by one waiter, the queue head of the waiting enqueuing queue is unchanged in position, the position of the rear of the queue is moved forward by one waiter, and the "pos" and the "wait" of that caller will also be changed in value. As illustrated in FIG. 8(a), during communication of W0, W3 in the waiting enqueuing queue cancels waiting and is removed from the queue, and then both of the callers W4 and W5 following W3 are moved forward by one waiter, thereby forming the waiting enqueuing queue resulting from the rearrangement as illustrated in FIG. 8(b). As illustrated in FIG. 8(b), the positions of the callers W4 and W5 are moved forward respectively by one waiter, and the current values of the rearranged positions of W4 and W5 are 3 and 4 respectively; and the values of the "waits" are 3 and 4 respectively, and the pointer "rear" at the rear of the queue points to the position of W5 in the waiting enqueuing queue and the value thereof becomes 4.

Furthermore, several points shall be noted:

1. Each time a caller is added into the queue, the caller will receive a notification message containing a waiting queue value corresponding to the caller and can perform communication with the callee when the waiting queue value is 0; and when a caller in the waiting enqueuing queue of the callee is intended to cancel waiting, the caller cancelling waiting will be removed from the waiting queue, and the application server shall send respective waiting notification messages containing updated waiting queue values to the respective other callers following the caller cancelling waiting regardless of the position of the caller cancelling waiting in the waiting enqueuing queue;

2. When the callee is in a busy status, a waiting notification message containing a waiting queue value corresponding to a caller is fed back to the caller through calculating and inquiring the waiting queue of the callee, and the caller will receive the waiting notification message only if the callee is in a busy status. When the first calling user calls the called user, a normal connecting process is carried out; and when the second calling user initiates a call and the callee has not ended communication with the first calling user, the callee will feed back busy callee information to the application server. Then an enqueuing queue processing flow will be carried out for the second calling user and a waiting notification message will be sent to the second calling user.

3. The callee will send a connection release message upon ending communication with a caller, and at this time, the waiting enqueuing queue of the callee shall be updated, and respective waiting notification messages containing updated waiting queue values will be sent to respective calling terminals originally enqueued following the caller with the ending of a call.

Figure 9:
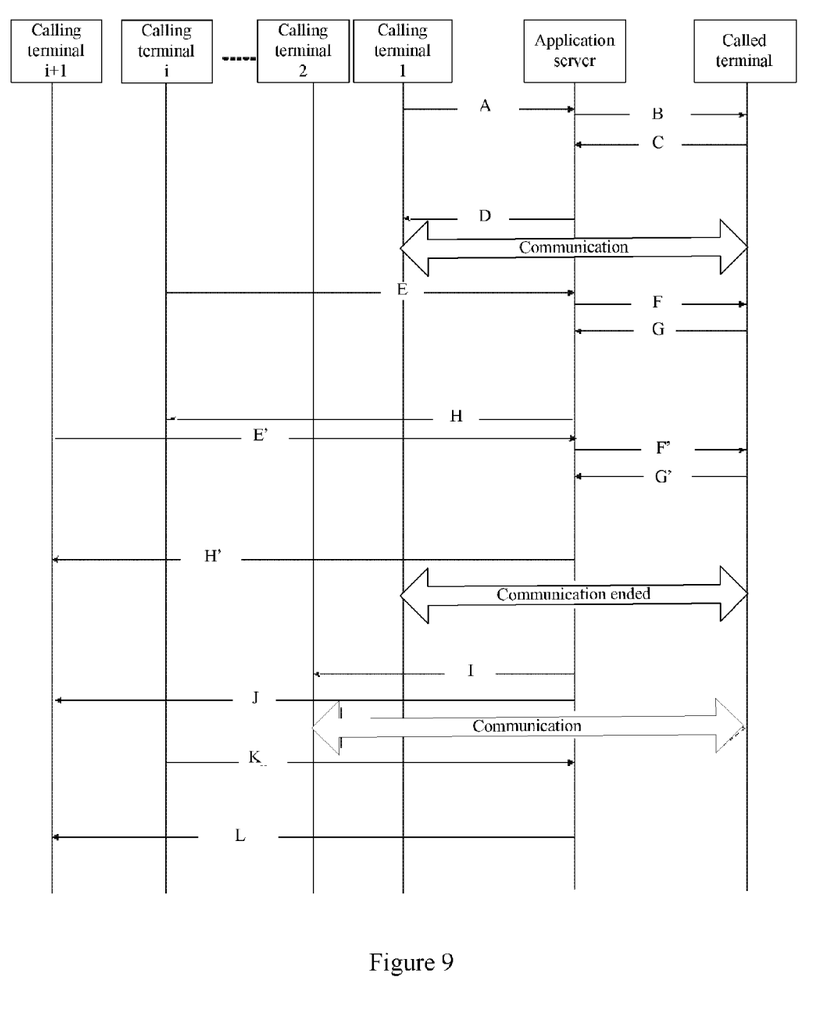
FIG. 9 is a schematic diagram of a fourth embodiment of the message-based notifying method for notifying about a waiting queue according to the invention.

FIG. 9 is a schematic diagram of a fourth embodiment of the message-based notifying method for notifying about a waiting queue according to the invention. A specific application flow of the invention will be described illustratively below with reference to the embodiments of FIG. 9 as well as FIG. 2 to FIG. 8. As illustrated in FIG. 9, this embodiment particularly includes:

A. A calling terminal 1 sends a call request to a called terminal;

B. An application server acquires from an inquiry that the calling terminal 1 is not in a blacklist of the called terminal, and then forwards the call request of the calling terminal 1 to the called terminal;

C. The called terminal is idle and returns a response message indicating that the called terminal is available for connecting-to;

D. The application serve receives the returned response message of the called terminal, initiates an enqueuing queue process (as illustrated in the embodiments of FIG. 5 to FIG. 8) and connects the calling terminal 1 to the called terminal, and as illustrated in FIG. 9, the calling terminal 1 and the called terminal perform communication;

E. As illustrated in FIG. 9, a calling terminal i initiates a call request during communication of the calling terminal 1 and the called terminal;

F. The application server acquires from an inquiry that the calling terminal i is not in the blacklist of the called terminal, and then forwards the call request of the calling terminal i to the called terminal;

G. The called terminal is in a busy status of ongoing communication with the calling terminal 1 and returns a response message indicating that the called terminal is busy;

H. The application server receives the returned response message of the called terminal, initiates an enqueuing queue process, and sends to the calling terminal i a waiting notification message containing a waiting queue value corresponding to the calling terminal i;

E'. There are i+1 calling terminals which initiates sequentially call requests during communication of the calling terminal 1 and the called terminal; and as illustrated in FIG. 9, one of the calling terminals, which is the last to initiate a call request, i+1, sends a call request to the called terminal;

F'. The application server acquires from an inquiry that the calling terminal i+1 is not in the blacklist of the called terminal, and then forwards the call request of the calling terminal i+1 to the called terminal;

G'. The called terminal is in ongoing communication with the calling terminal 1 and returns a response message indicating that the called terminal is busy;

H'. The application server receives the returned response message of the called terminal, initiates an enqueuing queue process, and sends to the calling terminal i+1 a waiting notification message containing a waiting queue value corresponding to the calling terminal i+1;

I. The calling terminal 1 ends communication with the called terminal, both the calling terminal 1 and the called terminal send connection release messages, and upon reception of the connection release messages of the calling terminal 1 and the called terminal, the application server initiates an enqueuing queue process, and as illustrated in the embodiments of FIG. 6 and FIG. 7, updates the waiting enqueuing queue, and sends to a calling terminal 2 a waiting notification message containing an updated waiting queue value corresponding to the calling terminal 2; and the calling terminal 2 has the updated waiting queue value with the value of 0 and can establish a connection with the called terminal for communication;

J. The application server sends respective waiting notification messages containing respective new waiting queue values to respective calling terminals following the calling terminal 2, and as illustrated in FIG. 9, resends to the calling terminal i+1 a waiting notification message containing a waiting queue value corresponding to the calling terminal i+1 resulting from updating of the waiting enqueuing queue;

K. When a caller in the waiting enqueuing queue cancels waiting in the midway, as illustrated in FIG. 9, the calling terminal i decides to cancel waiting after a long wait, and its user hangs up and sends a waiting cancellation message;

L. Upon reception of the waiting cancellation message of the calling terminal i, the application server initiates an enqueuing queue process, and as illustrated in the embodiments of FIG. 8(a) and FIG. 8(b), rearranges the waiting queue, and sends to the continuously waiting calling terminal i+1 following the calling terminal i a waiting notification message containing a waiting queue value corresponding to the calling terminal i+1 resulting from rearrangement of the waiting enqueuing queue.

Waiting notification messages contain updated waiting queue values corresponding to respective calling terminals, which indicates that the current numbers of preceding users have been changed, to that the calling terminals in a waiting status can acquire the current numbers of preceding users in a timely way.

The method for notifying about a waiting queue according to the invention can be applicable to a real time voice service in such a way that a calling terminal initiating a call request can be notified about the status of a called terminal and a waiting condition for the calling terminal in a way of voice, short message, etc., for example, in a voice announcement "5 users preceding you are waiting for communication with xxx".

Figure 10:
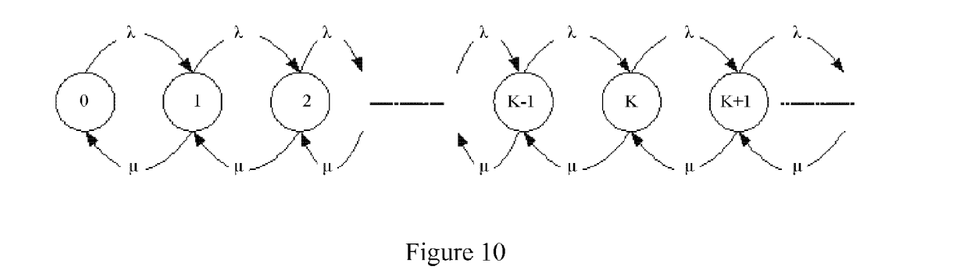
FIG. 10 is a status flow diagram of an embodiment of an M/M/1 enqueuing model adopted for the message-based notifying method for notifying about a waiting queue according to the invention.

FIG. 10 is a status flow diagram of an embodiment of an M/M/1 enqueuing model adopted for the message-based notifying method for notifying about a waiting queue according to the invention. FIG. 10 is the enqueuing model adopted according to the invention, and FIG. 1 is a single service window loss queuing model M/M/1/1 in an existing voice call service.

As can be apparent from comparing FIG. 10 with FIG. 1, the existing M/M/1/1 model refers to that a callee is in communication with only one caller at a time, the sum of the number of calling user(s) being served and the number of waiting calling user(s) is 1, i.e., the maximum enqueuing capacity is 1, and only a caller is allowed to be served at a time. The single service window waiting queuing model M/M/1 is adopted as a message queue call model according to the invention, and there is no constraint on the maximum enqueuing capacity of the waiting queuing model, which is deemed infinite by default, that is, an infinite number of waiters are allowed to be enqueued. As illustrated in FIG. 10, "0" in the figure denotes 0 user at that time, "1" denotes 1 user, . . . , k denotes k users at that time of which 1 user is in ongoing communication and k−1 users are being enqueued, and so on. The method for notifying about a waiting queue according to the invention essentially differs from the existing enqueuing call mechanism in that the number of enqueued users will not be limited to 1 and a calling user can be notified in a waiting message notification about a waiting queue value related to the caller.

As determined dependent upon a presence capability of a calling terminal, a waiting notification message in use can be a voice notification, a short message notification, a multimedia message notification, an instant message notification, even an email notification, etc. For example, if the calling terminal is a fixed phone, then a voice notification can be used; and if the calling terminal is a mobile phone, then a notification of voice, short message, multimedia message, etc., can be used. Of course, various other real time notification approaches are also possible. For example, if the calling terminal is a fixed phone, then a short message notification can be directed to a mobile phone, an email box, etc., bound with the calling terminal.

Figure 11:
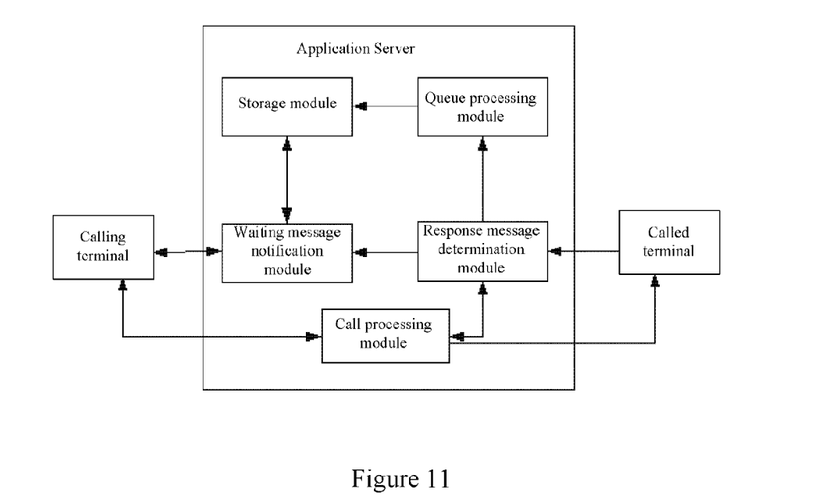
FIG. 11 is a schematic diagram of a first embodiment of an application server according to the invention.

Reference is made to FIG. 11 illustrating a schematic diagram of a first embodiment of an application server according to the invention. As illustrated in FIG. 11, a call processing module in this embodiment is a module with which a general application server is provided, which is adapted to perform basic call processing and connecting processes between a calling terminal and a called terminal, and as compared with an existing server, this embodiment further includes:

A response message determination module connected with the call processing module and adapted to receive a response message returned from the called terminal, to determine whether the called terminal is in an idle status, and to establish a connection between the calling terminal and the called terminal through the call processing module when the called terminal is indicated in the response message to be in an idle status; and to receive a waiting cancellation message sent from the calling terminal upon quitting in the midway from a waiting enqueuing queue of the called terminal and/or a connection release message of the calling/called terminal upon ending of communication;

A queue processing module connected with the response message determination module and adapted to add the calling terminal into the waiting enqueuing queue of the called terminal when the called terminal is in a busy status, to receive the connection release message or the waiting cancellation message forwarded from the response message determination module, and to update the waiting enqueuing queue of the called terminal after a calling terminal ends a call or quits in the midway; and to calculate waiting queue values corresponding to respective calling terminals in the waiting enqueuing queue of the called terminal;

A storage module connected with the queue processing module and adapted to store the waiting queue values corresponding to the respective calling terminals; and A waiting message notification module connected with the storage module and the response message determination module and adapted to send to the calling terminal a waiting notification message containing the waiting queue value corresponding to the calling terminal when the response message returned from the called terminal indicates that the called terminal is in a busy status; and to receive an initiative inquiry information of a calling terminal, to inquire the storage module, and to send to the inquiring calling terminal a waiting notification message containing the waiting queue value corresponding to the calling terminal.

The embodiment of FIG. 11 can send to the calling terminal a waiting notification message containing a waiting queue value, so that the calling terminal can take measures immediately to give up wait if there is a too large number of current waiters of the called terminal to thereby avoid a waste of time of the calling terminal, and it also can acquire a waiting queue condition of the called terminal in a timely way.

Figure 12:
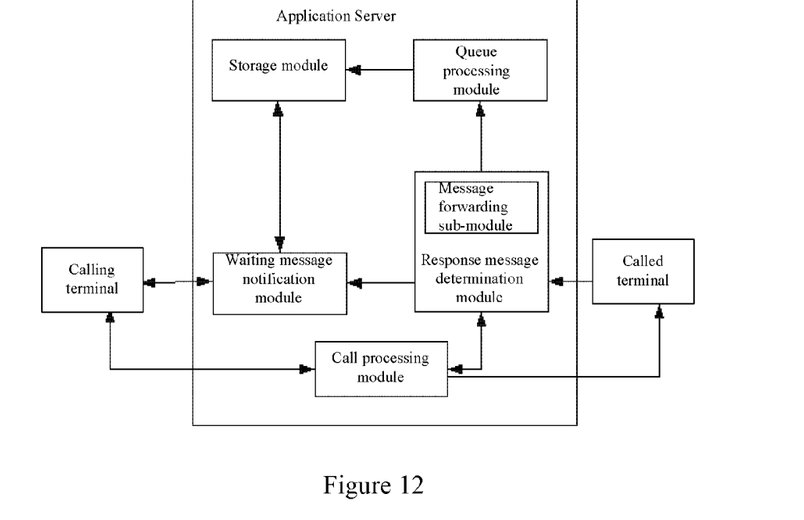
FIG. 12 is a schematic diagram of a second embodiment of the application server according to the invention.

FIG. 12 is a schematic diagram of a second embodiment of the application server according to the invention. FIG. 12 is similar to FIG. 11, and identical modules provide corresponding functions and effects to those in FIG. 11, and their repeated descriptions will be omitted here. The message response module in this embodiment is further divided in such a way that the message response module includes a message forwarding sub-module connected with the queue processing module and adapted to receive the waiting cancellation message sent from the calling terminal upon quitting in the midway from the waiting enqueuing queue of the called terminal and/or the connection release message sent from the calling/called terminal upon ending of communication and to forward the message(s) to the queue processing module. While receiving the waiting cancellation message send from a calling terminal, the queue processing module deletes the calling terminal from the waiting enqueuing queue of the called terminal, and rearranges the waiting enqueuing queue of the called terminal; while receiving the connection release message of the called terminal, the queue processing module updates the waiting enqueuing queue of the called terminal.

This embodiment distinguishes waiting conditions and reactions thereto of the caller and will rearrange the waiting enqueuing queue when the caller cancels waiting as illustrated in FIG. 8(a) and FIG. 8(b) and update the waiting queue when the callee ends communication with a caller as illustrated in FIG. 7.

Figure 13:
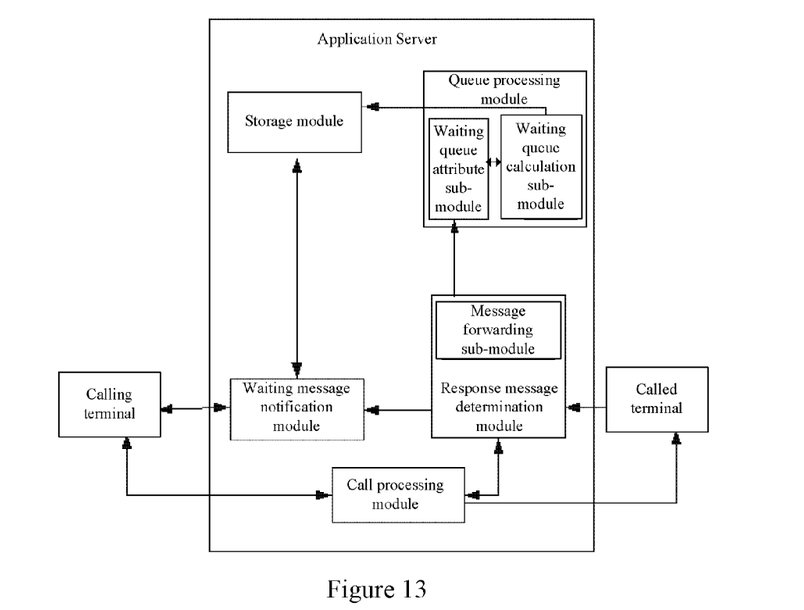
FIG. 13 is a schematic diagram of a third embodiment of the application server according to the invention.

FIG. 13 is a schematic diagram of a third embodiment of the application server according to the invention. As compared with FIG. 12, this embodiment further divides modules internal to the queue processing module. As illustrated in FIG. 13, the queue processing module in this embodiment includes:

A waiting queue attribute sub-module connected with the message forwarding sub-module and adapted to arrange the positions of the respective calling terminals added into the waiting enqueuing queue of the called terminal in the order that the calling terminals send call requests to the called terminal (particularly see FIG. 6), and to store the positions of the queue head and the queue rear of the waiting enqueuing queue; and A waiting queue calculation sub-module connected with the waiting queue attribute sub-module and adapted to calculate the waiting queue values of the respective calling terminals in the waiting enqueuing queue of the callee from the positions of the respective calling terminals in the waiting enqueuing queue and the position of the queue head.

The structures and functional modules internal to the above application server can be understood with reference to the embodiments of the method for notifying about a waiting queue according to the invention, and the respective functions in the above method can be implemented primarily with execution logics internal to the application server. The called terminal waiting queue attribute sub-module in the above embodiment can be further divided into:

A queue rearrangement sub-unit connected with the message forwarding sub-module and adapted to receive a waiting cancellation message sent from a calling terminal, to move forward by one waiter the positions of the respective continuously waiting calling terminals following the calling terminal sending the waiting cancellation message in the original waiting enqueuing queue, and to move forward by one waiter the position of the queue rear of the waiting enqueuing queue without changing the position of the queue head; and A queue update sub-unit connected with the message forwarding sub-module and adapted to receive a connection release message sent from the called terminal or a calling terminal, to remove the calling terminal at the forefront of the waiting enqueuing queue from the queue, to establish a communication connection thereof with the called terminal, and to recalculate the waiting queue values corresponding to the respective calling terminals in the waiting enqueuing queue, so that the waiting queue values of the respective calling terminals in the waiting enqueuing queue are updated by being decrementing by one.

In summary, the embodiments of the invention provide a message-based notifying method for notifying about a waiting queue and an application server, so that when a called terminal is busy, the message-based notifying method for notifying about a waiting queue and the application server presented according to the embodiments of the invention can notify accurately a calling terminal about a waiting queue notification message containing a waiting queue value to prompt the calling terminal about the number of current preceding waiters, i.e., how many users for whom the calling terminal has to wait until it can establish a call connection with the called user, and thus the calling terminal can decide whether it is necessary to continue with waiting to thereby avoid a waste of time; the embodiments of the invention can further analyze various conditions of the calling terminal and the called terminal in actual use and deal differently with various operations, for example, perform different processes for operations of a "blacklist", waiting cancellation, quitting in the midway, etc.; and the embodiments of the invention also present examples of various notifications for a waiting notification message, for example, any one or combination of a voice notification, a short message notification, a multimedia message notification, an email notification and a notification to another terminal bound with the calling terminal, to prompt the calling terminal about a current waiting queue value, thereby enriching the form of a notification. The invention can enable an information process to be performed between the calling terminal and the called terminal in an interactive and real time communication mode with integration of data and multimedia.

Those ordinarily skilled in the art can appreciate that all or a part of the steps in the above method embodiments can be performed by a program instructing relevant hardware, which may be stored in a computer readable storage medium, and which upon being executed can perform the steps in the above method embodiment. The storage medium includes various mediums capable of storing program codes, e.g., an ROM, an RAM, a magnetic disk, an optical disk, etc.

Finally it shall be noted that the foregoing descriptions are merely illustrative but not limitative of the technical solutions of the invention; although the invention has been detailed in connection with the embodiments thereof, those ordinarily skilled in the art shall appreciate that they still can modify the technical solutions recited in the foregoing respective embodiments or make equivalent substitutions for a part of technical features therein; and these modifications or substitutions will not render the essence of the corresponding technical solutions to go beyond the spirit and scope of the technical solutions in the respective embodiments of the invention.

The invention claimed is:

1. A message-based notifying method for notifying a waiting queue, comprising:
    sending, by a calling terminal, a call request to a called terminal;
    forwarding, by an application server, to the called terminal the call request sent from the calling terminal, and determining from a response message returned from the called terminal whether the called terminal is in an idle status; and
    if the called terminal is in a busy status, then adding by the application server the calling terminal into a waiting queue of the called terminal, and sending to the calling terminal a waiting notification message containing a waiting queue value corresponding to the calling terminal, wherein the waiting queue value is the difference between the position of the calling terminal in the waiting queue and the position of a head of the waiting queue, wherein the waiting notification message containing the waiting queue value sent to the calling terminal enables the calling terminal to accurately know how many users for whom the calling terminal has to wait until the calling terminal can establish a call connection with the called terminal; or
    if the called terminal is in an idle status, then establishing directly a communication connection between the calling terminal and the called terminal;
    wherein before the application server forwards to the called terminal the call request sent from the calling terminal, the method further comprises:
    comparing the calling terminal against data stored in a "blacklist" of the called terminal, and omitting the step of forwarding to the called terminal the call request sent from the calling terminal if the calling terminal is recorded in the "blacklist".

2. The message-based notifying method for notifying a waiting queue according to claim 1, wherein the waiting notification message is sent to the calling terminal in any one or combination of a voice notification, a short message notification, a multimedia message notification or an email notification.

3. The message-based notifying method for notifying a waiting queue according to claim 1, further comprising:
    deleting the calling terminal from the waiting queue of the called terminal and rearranging the waiting queue of the called terminal when the calling terminal cancels the call request; and
    sending waiting notification messages containing waiting queue values resulting from rearrangement to respective calling terminals enqueued originally in the waiting queue following the calling terminal.

4. The message-based notifying method for notifying a waiting queue according to claim 3, wherein rearranging the waiting queue of the called terminal comprises:
    moving forward by one waiter the positions of the respective continuously waiting calling terminals following the calling terminal cancelling the call request in the original waiting queue so that the waiting queue values corresponding to the respective continuously waiting calling terminals following the calling terminal cancelling the call request are decremented by one.

5. The message-based notifying method for notifying a waiting queue according to claim 1, further comprising:
    sending by a calling terminal or the called terminal a connection release message when the call between the calling terminal and the called terminal is ended; and
    updating by the application server upon reception of the connection release message the waiting queue of the called terminal, and sending respective waiting notification messages containing updated waiting queue values to respective calling terminals in the waiting queue.

6. The message-based notifying method for notifying a waiting queue according to claim 5, wherein updating the waiting queue of the called terminal comprises:
    removing a calling terminal at the forefront of the waiting queue from the waiting queue, and establishing a communication connection thereof with the called terminal;
    moving forward by one waiter the positions of the respective continuously waiting calling terminals in the waiting queue, so that the waiting queue values corresponding to the respective continuously waiting calling terminals in the waiting queue are decremented by one.

7. The message-based notifying method for notifying a waiting queue according to claim 3, further comprising:
sending by a calling terminal or the called terminal a connection release message when the call between the calling terminal and the called terminal is ended; and
updating by the application server upon reception of the connection release message the waiting queue of the called terminal, and sending respective waiting notification messages containing updated waiting queue values to respective calling terminals in the waiting queue.

8. The message-based notifying method for notifying a waiting queue according to claim 7, wherein updating the waiting queue of the called terminal comprises:
removing a calling terminal at the forefront of the waiting queue from the waiting queue, and establishing a communication connection thereof with the called terminal;
moving forward by one waiter the positions of the respective continuously waiting calling terminals in the waiting queue, so that the waiting queue values corresponding to the respective continuously waiting calling terminals in the waiting queue are decremented by one.

9. An application server, comprising a call processing module configured to perform basic call processing and connecting processes between a calling terminal and a called terminal, wherein the call processing module is further configured to compare the calling terminal against data stored in a "blacklist" of the called terminal, and to forward to the called terminal a call request sent from the calling terminal if the calling terminal is not recorded in the "blacklist", and not to forward to the called terminal the call request sent from the calling terminal if the calling terminal is recorded in the "blacklist";
wherein the application server further comprises:
a response message determination module connected with the call processing module and configured to receive a response message returned from the called terminal, to determine whether the called terminal is in an idle status, and to establish a connection between the calling terminal and the called terminal through the call processing module when the called terminal is in an idle status;
a queue processing module connected with the response message determination module and configured to add the calling terminal into a waiting queue of the called terminal when the called terminal is in a busy status, and to calculate a waiting queue value corresponding to the calling terminal in the waiting queue of the called terminal, wherein the waiting queue value is the difference between the position of the calling terminal in the waiting queue and the position of a head of the waiting queue, wherein the waiting notification message containing the waiting queue value sent to the calling terminal enables the calling terminal to accurately know how many users for whom the calling terminal has to wait until the calling terminal can establish a call connection with the called terminal;
a storage module connected with the queue processing module and configured to store the waiting queue value corresponding to the calling terminal; and
a waiting message notification module connected with the storage module and the response message determination module and configured to send to the calling terminal a waiting notification message containing the waiting queue value corresponding to the calling terminal when the called terminal is in a busy status.

10. The application server according to claim 9, wherein the response message determination module is further configured to receive a waiting cancellation message sent from the calling terminal upon quitting in the midway from the waiting queue of the called terminal and/or a connection release message sent from the calling/called terminal upon ending of communication and to forward the message(s) to the queue processing module; and
the queue processing module is further configured to receive the connection release message or the waiting cancellation message forwarded from the response message determination module, and to update the waiting queue of the called terminal when the calling terminal ends a call with the called terminal or quits in the midway from the waiting queue of the called terminal.

11. The application server according to claim 10, wherein the storage module is further configured to update the stored waiting queue values corresponding to the respective calling terminals in the waiting queue of the called terminal after the waiting queue is updated by the queue processing module.

12. The application server according to claim 11, wherein the waiting message notification module is further configured to send to the respective calling terminals waiting notification messages containing the updated waiting queue values corresponding to the respective calling terminals after the waiting queue values are updated by the storage module.

13. The application server according to claim 9, wherein the waiting message notification module is further configured to receive an initiative inquiry information of a calling terminal, and to inquire the storage module about the waiting queue value corresponding to the calling terminal after receiving the initiative inquiry information of the calling terminal, and to send to the inquiring calling terminal a waiting notification message containing the waiting queue value corresponding to the calling terminal.

14. The application server according to claim 9, wherein the queue processing module comprises:
a waiting queue attribute sub-module connected with the response message determination module and configured to arrange the positions of the respective calling terminals added into the waiting queue of the called terminal when the called terminal is in a busy status in the order that the calling terminals send call requests to the called terminal, and to store the positions of the head of the waiting queue and a rear of the waiting queue; and
a waiting queue calculation sub-module connected with the waiting queue attribute sub-module and configured to calculate the waiting queue values corresponding to the respective calling terminals from the positions of the respective calling terminals in the waiting queue and the position of the head of the waiting queue.

15. The application server according to claim 10, wherein the queue processing module comprises:
a waiting queue attribute sub-module connected with the response message determination module and configured to arrange the positions of the respective calling terminals added into the waiting queue of the called terminal when the called terminal is in a busy status in the order that the calling terminals send call requests to the called terminal, and to store the positions of the head of the waiting queue and a rear of the waiting queue; and
a waiting queue calculation sub-module connected with the waiting queue attribute sub-module and configured to calculate the waiting queue values corresponding to the respective calling terminals from the positions of the respective calling terminals in the waiting queue and the position of the head of the waiting queue.

16. The application server according to claim 15, wherein the waiting queue attribute sub-module further comprises:
- a queue rearrangement sub-unit connected with the response message determination module and configured to delete a calling terminal from the waiting queue of the called terminal when receiving a waiting cancellation message sent from the calling terminal and forwarded by the response message determination module, and to move forward by one waiter the positions of the respective continuously waiting calling terminals following the calling terminal sending the waiting cancellation message in the original waiting queue; and
- a queue update sub-unit connected with the response message determination module and configured to remove the calling terminal at the forefront of the waiting queue from the queue when receiving a connection release message sent from the called terminal or the calling terminal and forwarded by the response message determination module, and to move forward by one waiter the positions of the respective continuously waiting calling terminals in the waiting queue.

17. The application server according to claim 16, wherein after the calling terminal at the forefront of the waiting queue is removed from the queue, a communication connection between the calling terminal and the called terminal are established by the call processing module.

18. The application server according to claim 16, wherein the storage module is further configured to update the stored waiting queue values corresponding to the respective continuously waiting calling terminals after the queue rearrangement sub-unit performs moving forward by one waiter the positions of the respective continuously waiting calling terminals following the calling terminal sending the wait cancellation message in the original waiting queue or after the queue update sub-unit performs moving forward by one waiter the positions of the respective continuously waiting calling terminals in the waiting queue.

19. The application server according to claim 18, wherein the waiting message notification module is further configured to send to the respective calling terminals waiting notification messages containing the updated waiting queue values corresponding to the respective calling terminals after the waiting queue values are updated by the storage module.

* * * * *